United States Patent [19]

Dubois

[11] Patent Number: 4,850,756

[45] Date of Patent: Jul. 25, 1989

[54] PORTABLE ALIGN BORING MACHINE

[76] Inventor: Gerald J. Dubois, 634 Monique Street, Chelmsford, Ontario P0M 1L0, Canada

[21] Appl. No.: 134,434

[22] Filed: Dec. 17, 1987

[51] Int. Cl.$^4$ .................. B23B 39/00; B23B 47/00; B23B 49/00

[52] U.S. Cl. .................. 408/72 R; 408/708; 408/709

[58] Field of Search .............. 408/72 R, 708, 709, 408/79, 80, 81, 82; 82/1.4

[56] References Cited

U.S. PATENT DOCUMENTS 4,652,186  3/1987  Sverdlin .................. 408/708

Primary Examiner—Bruce Y. Arnold
Assistant Examiner—J. Ryan
Attorney, Agent, or Firm—Robert F. Delbridge; Arne I. Fors

[57] ABSTRACT

A self-centering and aligning attachment assembly for attaching a portable align boring machine to a workpiece or associated support for machining a bore in the workpiece includes first and second attachment subassemblies. The a first attachment sub-assembly has a first tubular member through which the boring bar can pass and which is securable to the boring machine. The second attachment sub-assembly has a second tubular member through which the boring bar can pass, and which is securable to the workpiece or associated support with an inner bearing member in alignment with the bore in the workpiece to be machined. A collar member of the first attachment sub-assembly is securable to the second tubular member of the second attachment sub-assembly to enable the boring machine with the first attachment sub-assembly secured thereto to be secured to the second attachment sub-assembly after the second attachment sub-assembly has been secured to the workpiece or associated support and aligned with the bore in the workpiece, an outer bearing member of the first attachment sub-assembly and a co-operating inner bearing member of the second attachment subassembly being self-centering.

5 Claims, 7 Drawing Sheets

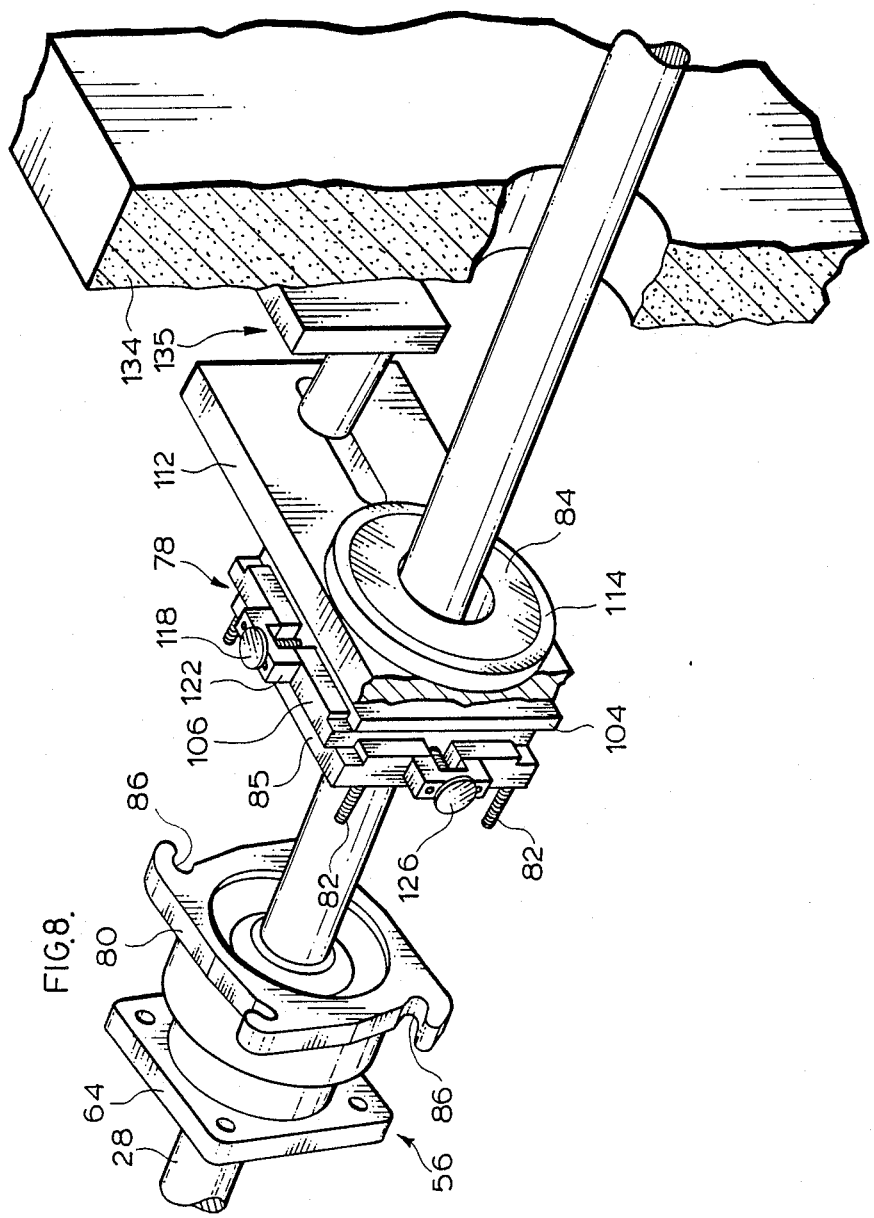

PORTABLE ALIGN BORING MACHINE

This invention relates to portable align boring machines and to attachment assemblies therefore.

Such machines are used to machine bores in equipment at the place where the equipment is used, i.e. on-site. Portable align boring machines are thus useful, for example, when the equipment is too big and/or too heavy to be readily transported to a machine tool workshop, or when there is no readily available workshop in the area where the equipment is used. Such machines can of course be conveniently used in a workshop if desired.

A portable align boring machine is described in U.S. Pat. No. 4,406,566 (Bauer) issued Sept. 27, 1983, the contents of which are hereby incorporated by reference in this application. The described machine comprises an annular drive housing, a drive sleeve rotatably mounted in the housing, an elongated boring bar positioned to extend through the drive sleeve so as to rotate therewith and be capable of longitudinal movement relative thereto, boring tool mounting means at one end of the boring bar, means for rotating the drive sleeve and consequently the boring bar, means for moving the boring bar longitudinally relative to the drive sleeve while the boring bar is rotating therewith, and an attachment assembly attachable to one end of the drive housing and attachable to a workpiece or associated support to secure the drive housing to the workpiece or associated support to enable the boring bar to pass through the attachment assembly to the workpiece and to enable a boring tool carried by the mounting means to engage a bore in the workpiece.

Such a machine is extremely versatile and can be used for many boring applications. For example, with different appropriate boring tools fitted on the mounting means, the machine can be used to service bores from about 1.375 inches (3.5 cms) to about 24 inches (60 cms) in diameter and higher. The boring bar may for example be up to about 8 feet (2.4 m) in length or more.

The various attachment assemblies described in the above mentioned U.S. Patent are suitable for many applications. machine to be more easily used for such applications and other However, in order to enable such a portable align boring applications, an improved attachment assembly is desirable.

It is therefore an object of the invention to provide an improved attachment assembly for portable align boring machines of the kind referred to.

According to the invention, an attachment assembly comprises:

a first attachment sub-assembly having a first tubular member through which the boring bar can pass, the first tubular member having means to enable the first tubular member to be secured to the boring machine and having a first inner bearing member with an inner bearing surface to slidably and rotatably receive the boring bar, the first tubular member also having an outer bearing member with an outwardly curved and an outwardly facing bearing surface, and a collar member surrounding the first tubular member and having an inwardly facing curved bearing surface slidably engaging the outwardly facing curved bearing surface of the outer bearing member to enable the collar member to move angularly relative to the first tubular member, and a second attachment sub-assembly having a second tubular member through which the boring bar can pass, and a second inner bearing member with an inner bearing surface to slidably and rotatably receive the boring bar, the second inner bearing member also having an outer curved bearing surface and the second tubular the outer curved bearing surfaced of the second inner bearing member having an inner curved bearing surface engaging member to enable the second inner bearing member to move angularly to the second tubular member, the second tubular member having means to enable the second tubular member to be secured to the workpiece or associated support with the second inner bearing member in alignment with the bore in the workpiece to be machined, the collar member of the first attachment sub-assembly sub-assembly having co-operating means to enable the and the second tubular member of the second attachment first attachment sub-assembly to be secured to the second attachment sub-assembly whereby the boring machine with the first attachment sub-assembly secured thereto can be secured to the second attachment sub-assembly after the second attachment sub-assembly has been secured to the workpiece or associated support and aligned with the bore in the workpiece.

Advantageously, the inner bearing member of the first attachment sub-assembly is positioned to engage the second inner bearing member of the second attachment sub-assembly and maintain the second inner bearing member in proper alignment when the collar of the first attachment sub-assembly is secured to the second tubular member of the second attachment sub-assembly.

The co-operating means to enable the first attachment sub-assembly to be secured to the second attachment sub-assembly may comprise a series of bolts with manually tightenable nuts thereon projecting from the second tubular member of the second attachment sub-assembly and a corresponding series of transverse open recesses in the column member to enable to the collar member to be secured to the second tubular member by transverse angular movement of the collar member to cause the bolts to be received in the recesses and by subsequent manual tightening of said nuts to the collar member against the second tubular member.

The means to enable the second tubular member to be secured to the workpiece or associated support in alignment with the bore in the workpiece may comprise a first adjustment plate having an aperture through which the second tubular member passes and having means to position the first adjustment plate in a predetermined position relative to the bore in the workpiece, and a second adjustment plate having an aperture through which the second tubular member passes, the first and second adjustment plates having manually adjustable cooperating means to enable the second adjustment plate to be bar; and the second tubular member and the second adjustmemt moved in one direction transverse to the length of the boring plate having manually adjustable co-operating means to enable the second tubular member to be moved in a direction perpendicular to said one direction and transverse to the length of the boring bar.

One embodiment of the present invention will be described, by way of example, with reference to accompanying drawings, of which:

FIG. 8 is a perspective view showing the first attachment sub-assembly adjacent but not secured to the second attachment sub-assembly.

Figure 1:
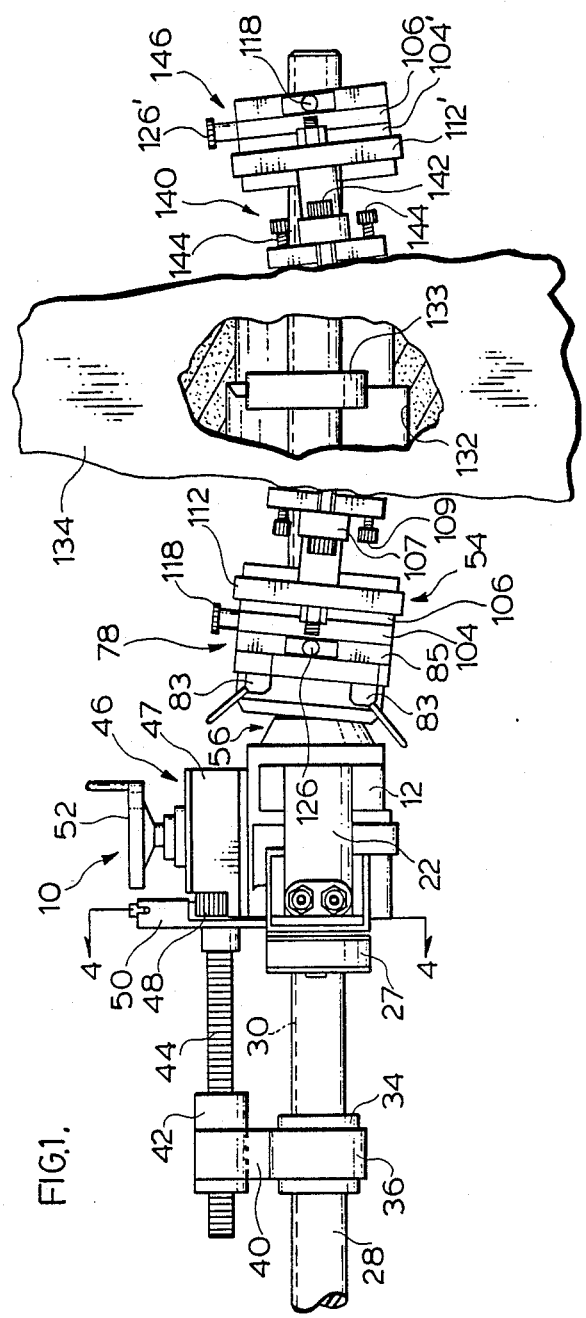
FIG. 1 is a side view of a portable align boring machine with an attachment assembly in accordance with the invention securing the machine to a support secured to a workpiece.

Referring to the drawings, a portable align boring machine 10 includes an annular drive housing 12 with a drive sleeve 14 mounted for rotation therein by means of bearings 16. The drive sleeve 14 projects rearwardly from the housing 12, and the projecting portion carries a driven pulley 20. A housing 12, with its drive shaft 24 carrying a drive pulley 26. hydraulically-operated drive motor 22 is secured to the drive 27. An elongated boring bar 28 extends through the drive The driven and drive pulleys 20, 26 are connected by drive belt sleeve 14 and is slidable longitudinally relative thereto. The boring bar 28 has a longitudinal extending slot 30 engaged by key 32 secured to the driving sleeve 14 so that the boring bar 28 rotates therewith.

A portion of the boring bar 28 which extends rearwardly from the drive housing 12 beyond the pulley 20 passes through a sleeve 34 rotatably mounted in a collar 36, the boring bar 28 being secured to the sleeve 34 by a clamp (not shown) so that the boring bar 28 will rotate and move longitudinally with the sleeve 34. The collar 36 has a laterally extending intermediate portion 40 which extends to an internally threaded sleeve 42. An advancing screw rod 44 extends through the threaded sleeve 42 to an advancing mechanism 46 carried by the drive housing 12.

The advancing mechanism 46 comprises a housing 47 from which the advancing screw rod 44 projects, the advancing screw rod 44 carrying a ratchet wheel 48 operated by a ratchet tooth is actuated by the cam 18 which rotates with the drive sleeve 49. The ratchet tooth 49 is carried by a cam follower 50 which 14. As the drive sleeve 14 rotates, the ratchet wheel 48 is actuated to rotate the advancing screw rod 44 incrementally, in one direction or the other as selected by the position of the ratchet wheel 49, with the result that the threaded sleeve 42 is moved longitudinally in an incremental manner as the boring bar 28 rotates. The boring bar 28 is thus also moved longitudinally in an incremental manner by the sleeve 34. The assembly 52 by means of which the advancing mechanism 46 can be advancing mechanism 46 also includes a manually-operable wheel actuated manually to position the boring bar 28 longitudinally. The wheel 52 is mounted on a shaft 51 carrying a bevel gear 51a which engages a bevel gear 51b mounted on the advancing screw rod 44.

The structure and operation of the boring machine as so far described and illustrated is generally similar to that described and illustrated in the above mentioned U.S. Pat. No. 4,406,566.

An attachment assembly 54 in accordance with the invention is secured to the front end of the drive housing 12. The attachment assembly 54 comprises a first attachment subassembly 56 having a first tubular member 57 securable at its rear end to the front end of the housing 12 by bolts 58. The front portion 60 of the first tubular member 57 is cylindrical, and the rear portion 62 flares outwardly to a flange 64 through which the bolts 58 pass. The cylindrical front portion 60 of the first tubular member 57 carries an annular outer bearing member 66 with an outwardly curved and outwardly facing bearing surface 68. The bearing member 66 is held in position relative to the cylindrical front portion 60 of the first tubular member 57 by pins 70. The cylindrical front portion 60 also carries an annular inner cylindrical bearing member 72 with an inner bearing surface 73 which slidably receives the boring bar 28. The inner cylindrical bearing member 72 is a friction fit in a recess 74 which extends rearwardly from the front face 76 of the first tubular member 57.

Figure 6:
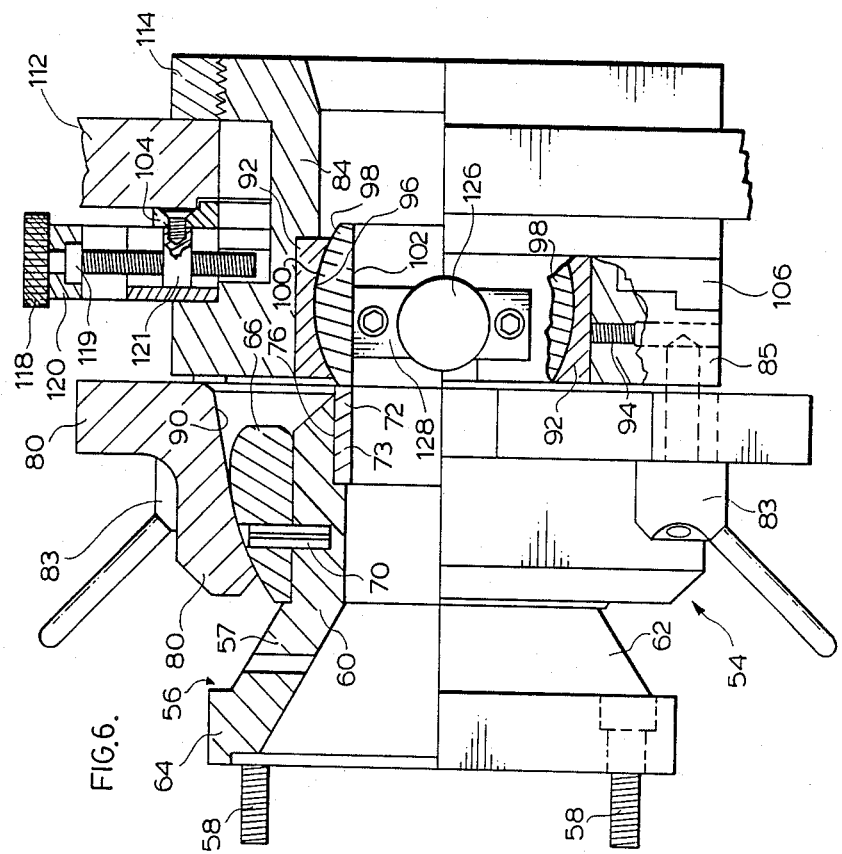
FIG. 6 is a plan view partly in section, of the attachment assembly.

The first attachment sub-assembly 56 also has a collar 80 with laterally extending open-ended recesses 86 (see FIG. 6) which can be engaged with a second tubular member as will be described in more detail later. The collar 80 has an inwardly facing and inwardly curved bearing surface 90 engaging the outwardly curved and outwardly facing bearing surface 68 of the outer bearing member 66 of the first tubular member 57.

The attachment assembly also has a second attachment sub-assembly 78 comprising a second tubular member 84 whose rear end has a flange 85 from which bolts 82 and nuts 83 project for attachment to the collar 80 of the first attachment sub-assembly 56 as will be described in more detail later.

The second tubular member 84 contains an inner annular bearing retainer 92 secured by set screws 94, the bearing retainer 92 having a curved inner bearing surface 96. The bearing retainer 92 retains a second inner bearing member 98 which has a curved outer surface 100 engaging the curved inner surface 96 of bearing retainer 92 and an inner cylindrical bearing surface 102.

The second attachment sub-assembly 78 also comprises a pair of apertured adjustment plates 104, 106 by means of which the second tubular member 84 can be aligned relative to a bore to be machined. Each adjustment plate 104, 106 has a central aperture 105, 107 through which the medial portion of the tubular member 84 passes. On its front face, adjustment plate 104 has a projecting rim 108 surrounding the aperture 105, the rim 108 being engagable in an aperture 110 in a support plate 112 as will be described in more detail later.

The rear face of adjustment plate 104 and front face of adjustment plate 106 have mutually-engaging keyways 114, 116 so that adjustment plate 106 can slide in one direction transverse to boring bar 28 relative to adjustment plate 104. Such sliding movement is effected by a manually operable adjustment screw 118 which passes through a carrier member 120 secured to the adjustment plate 106 into a threaded aperture 121 in the adjustment plate 104. The carrier member 120 is secured to adjustment plate 106 by screws 122, and adjustment screw 118 is longitudinally restrained in carrier member 120 by a force-fit washer 119. The adjustment screw 118 is manually adjustable to raise or lower the adjustment plate 106 relative to the adjustment plate 104.

The rear face of adjustment plate 106 and the front face of flange 85 of tubular member 84 have mutually-engaging key ways 123, 124 which are perpendicular to the previously mentioned key-ways 114, 116 so that flange 85 (and hence tubular member 84) can slide in a perpendicular direction direction. Such sliding movement is effected by a manually-transverse to the bore 28 relative to the previously mentioned operable adjustment screw 126 which passes through a carrier member 128 secured to flange 85 into a threaded aperture 130 in adjustment plate 106. The carrier member 128 is secured to flange 85 by screws 132, and adjustment screw 126 is longitudinally restrained in carrier member 128 by a force-fit washer 127.

Use of the attachment assembly will now be described with respect to the aligning and centering of the boring machine 10 preparatory to machining a bore 132 in a workpiece 134.

Figure 2:
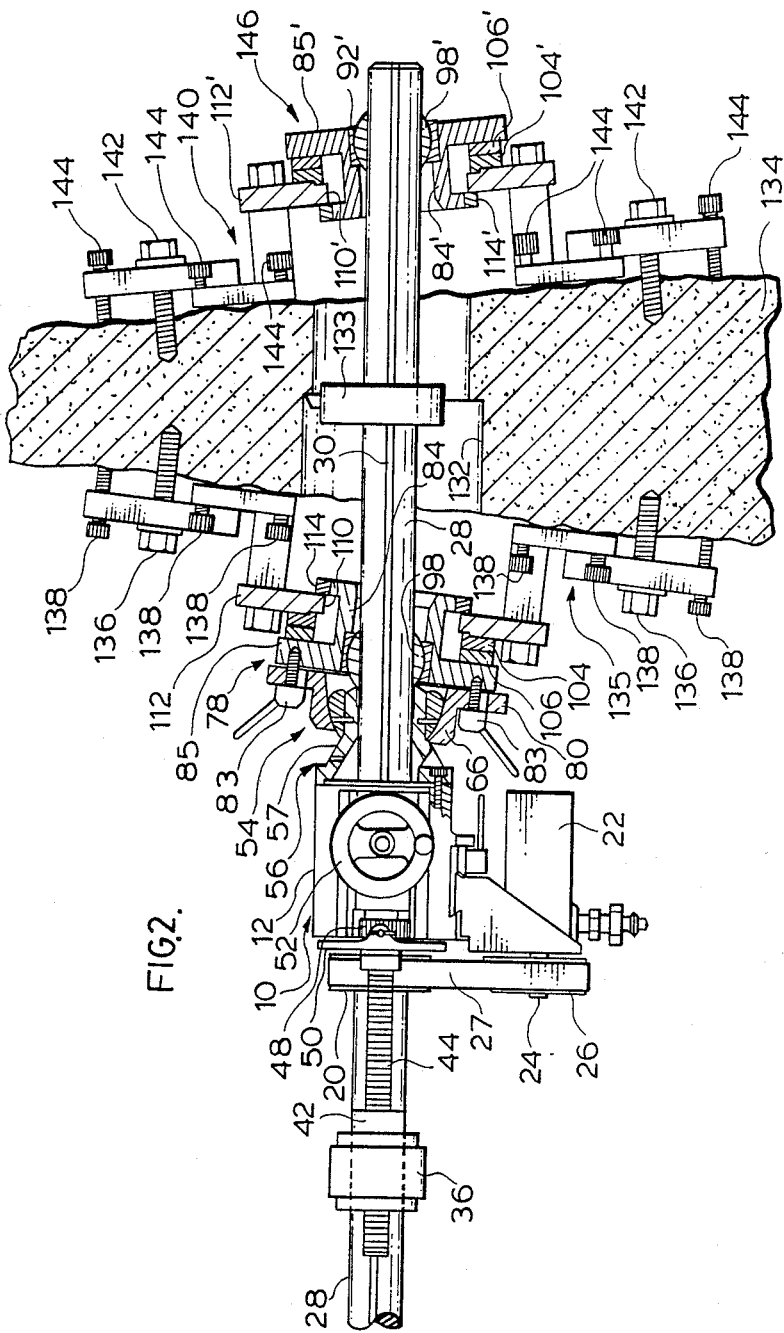
FIG. 2 is a plan view, partly in section, of the arrangement of FIG. 1.
Figure 3:
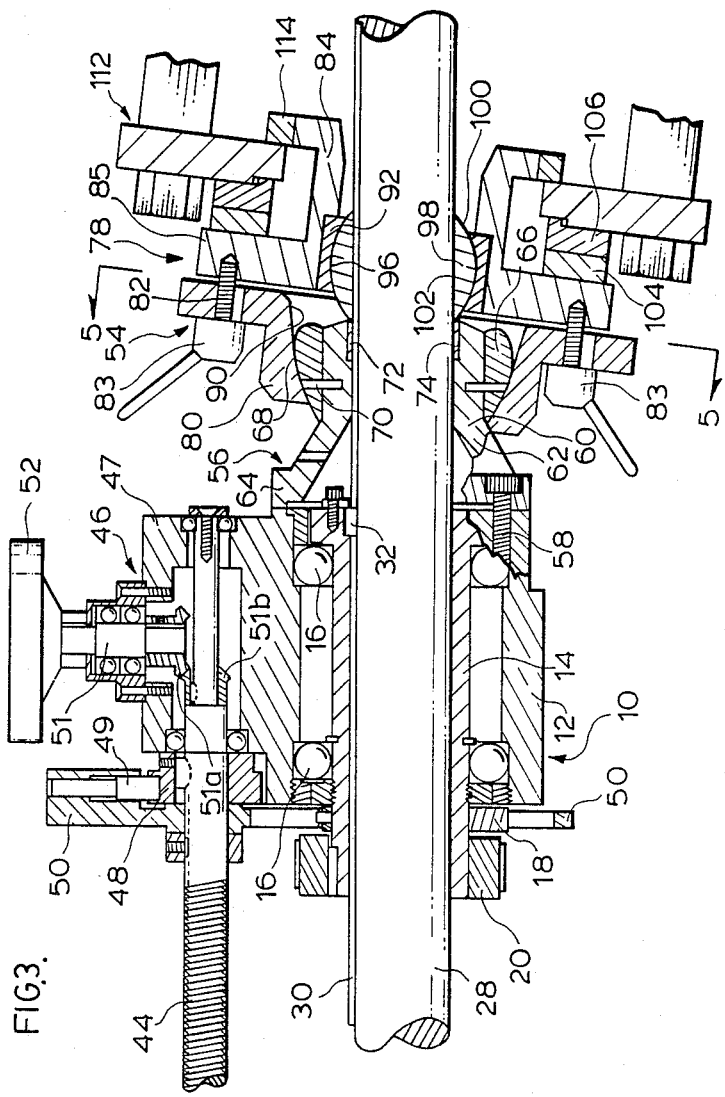
FIG. 3 is a longitudinal sectional view of the boring machine and the attachment assembly, with some parts of the machine being omitted for clarity.
Figure 4:
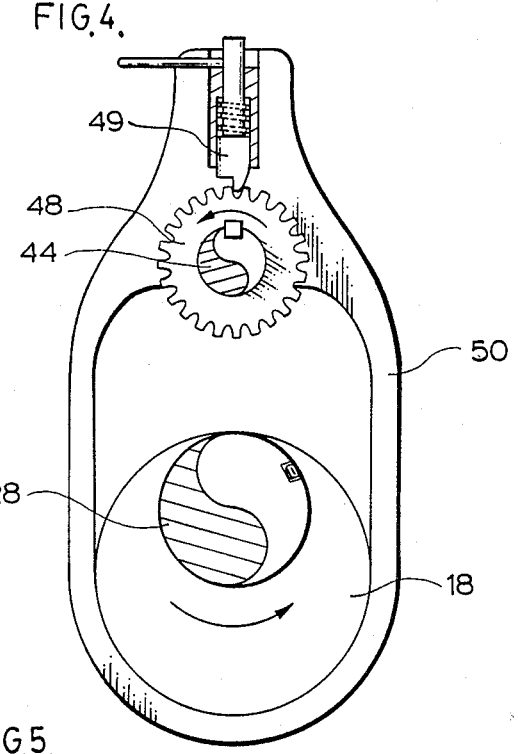
FIG. 4 is a sectional view along the line 4—4 of FIG. 1.
Figure 5:
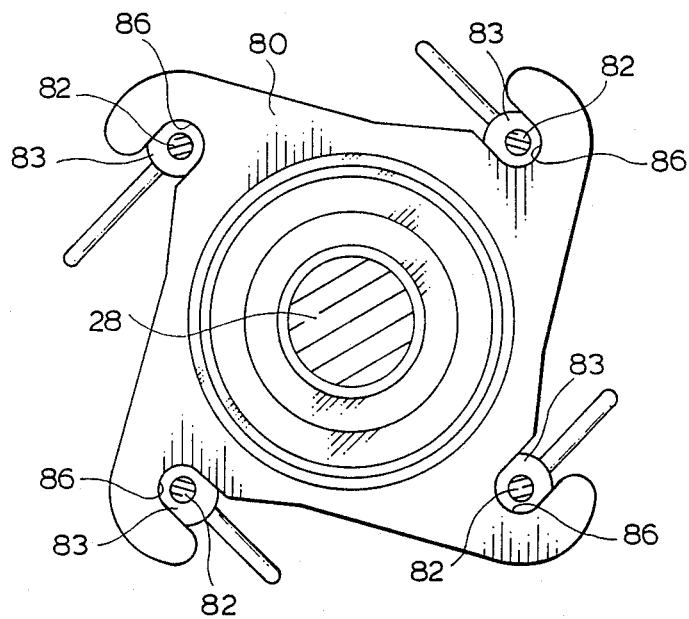
FIG. 5 is a sectional view along the line 5—5 of FIG. 3.

The support plate 112 is secured in place with its aperture 110 in general alignment with the bore 132 by first support bracket assembly 135 (FIG. 2) which is secured to the front of the workpiece 134 by main bolts 136 and adjustment bolts 138. A second support bracket assembly 140 (similar to the first bracket support assembly 135) is similarly secured to the rear face of the workpiece 134 by main bolts 142 and adjustment bolts 144. The second support bracket assembly 140 is provided to support an attachment sub-assembly 146 which is similar in construction to the second attachment sub-assembly 78 and similar but primed reference numerals are used to identify its various parts.

The second attachment sub-assembly 78 is loosely mounted on the support plate 112, that is to say with the projecting rim 108 of the first adjustment plate 104 engaged in the aperture 110 in the support plate 112. An anchoring nut 114 on a threaded front end of the second tubular member 84 is screwed into place but left loose. The attachment sub-assembly 146 is then loosely mounted on the support plate 112' in a similar manner. The boring bar 28, with a cutting tool 133 mounted thereon, is then passed through bearing 98 in the second attachment sub-assembly 78 and bearing 98' in the attachment sub-assembly 146. As can readily been seen from the drawings, any misalignment of the support plate 112 from the perpendicular to the bore 132 is accommodated by movement of the bearing member 98 within the second attachment sub-assembly 78.

Figure 7:
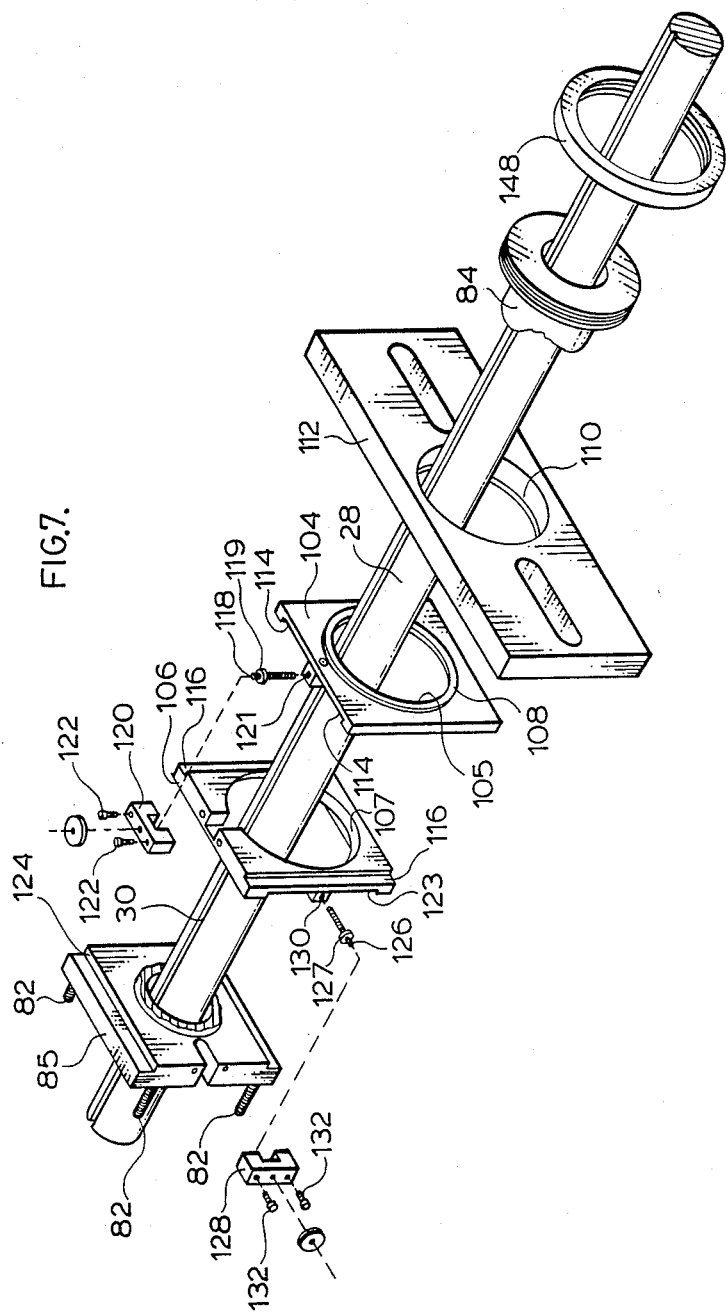
FIG. 7 is a exploded perspective view of a portion of the second attachment sub-assembly showing the means for aligning the second tubular member with a bore in the workpiece.

Using conventional measuring instruments, the boring bar adjustment knobs 118, 126 of the second attachment sub-assembly 28 is then centered in the bore 132 by manual adjustment of the 78 and adjustment knobs 118', 126' of attachment sub-assembly 146 to effect accurate alignment. In the orientation shown in FIGS. 7 and 8, adjustment of the knob 118 effects vertical adjustment and adjustment of the knob 126 effects horizontal adjustment. Thus, alignment of the boring bar 28 is effected without the weight of the boring machine 10 present, thereby avoiding difficulties in this respect which are encountered in prior art arrangements.

When the alignment has been effected, the boring machine 10 with the first attachment sub-assembly 56 already attached thereto is then mounted on the boring bar 28 and slid down to cause the inner bearing member 72 in the first attachment subassembly 56 to engage the inner bearing member 98 in the second attachment sub-assembly 78, thereby angularly locking the bearing member 98 in place. The collar 80 of the first attachment sub-assembly 78 is then tilted about outer bearing member 66 as necessary and rotated to cause bolts 82 projecting the open recesses 86 in collar 80. The nuts 83 dare then from flange 85 of the second tubular member 84 to enter into manually tightened to secure the first attachment sub-assembly 56 to the second attachment sub-assembly 78. The boring bar 10 is then in proper alignment and centered with respect to the bore 132 to be machined. The boring machine 10 is then operated in known manner to machine the bore 132.

The advantages of the invention will be readily apparent to a person skilled in the art from the foregoing description of a preferred embodiment, the scope of the invention being defined in the appended claims.

What is claimed is:

1. An attachment assembly for attaching a portable align boring machine to a workpiece or associated support for machining a bore in the workpiece, said boring machine comprising means for rotating and longitudinally advancing a boring bar carrying a boring tool,
    said attachment assembly comprising:
    a first attachment sub-assembly having a first tubular member, the first tubular member having means for securing the first tubular member to the boring machine and having a first inner bearing member with an inner bearing surface to slidably and rotatably receive the boring bar, the first tubular member also having an outer bearing member with an outwardly curved and an outwardly facing bearing surface, and a collar member surrounding the first tubular member and having an inwardly facing curved bearing surface slidably engaging the outwardly facing curved bearing surface of the outer bearing member to enable the collar member to move angularly relative to the first tubular member, and a second attachment sub-assembly having a second tubular member, the second tubular member having a second inner bearing member with an inner bearing surface to slidably and rotatably receive the boring bar, the second inner bearing member also having an outer curved bearing surface and the second tubular member having an inner curved bearing surface engaging the outer curved bearing surface of the second inner bearing member to enable the second inner bearing member to move angularly to the second tubular member, the second tubular member having means for securing the second tubular member to the workpiece or associated support with the second inner bearing member in alignment with the bore in the workpiece to be machined, the collar member of the first attachment sub-assembly and the second tubular member of the second attachment sub-assembly having co-operating means for securing the first attachment sub-assembly to the second attachment sub-assembly whereby the boring machine with the first attachment sub-assembly secured thereto can be secured to the second attachment sub-assembly after the second attachment sub-assembly has been secured to the workpiece or associated support and aligned with the bore in the workpiece.

2. An attachment assembly according to claim 1 wherein the first inner bearing member of the first attachment sub-assembly is engageable with the second inner bearing member of the second attachment sub-assembly to maintain the second inner bearing member in proper alignment when the collar of the first attachment sub-assembly is secured to the second tubular member of the second attachment sub-assembly.

3. An attachment assembly according to claim 1 wherein the co-operating means for securing the first attachment sub-assembly to the second attachment sub-assembly comprises a series of bolts with manually tightenable nuts thereon projecting from the second tubular member of the second attachment sub-assembly and a corresponding series of transverse open recesses in the collar member to enable the collar member to be secured to the second tubular member by transverse angular movement of the collar member to cause the bolts to be received in the recesses and by subsequent manual tightening of said nuts to the collar member against the second tubular member.

4. An attachment assembly according to claim 1 wherein the means for securing the second tubular member to the workpiece or associated support in alignment with the bore in the workpiece comprises a first adjustment plate having an aperture through which the second tubular member passes and having means for positioning the first adjustment plate in a fixed position relative to the bore in the workpiece, and a second adjustment plate having an aperture through which the second tubular member passes, the first and second adjustment plates having manually adjustable co-operating means to enable the second adjustment plate to be moved in one direction transverse to the length of the boring bar, and the second tubular member and the second adjustment plate having manually adjustable co-operating means of raving the second tubular member in a direction perpendicular to said one direction and transverse to the length of the boring bar.

5. An attachment assembly for attaching a portable align boring machine to a workpiece or associated support for machining a bore in the workpiece, said boring machine comprising means for rotating and longitudinally advancing a boring bar carrying a boring tool, said attachment assembly comprising first means for securing the attachment assembly to the boring machine, and second means for securing the attachment assembly to the workpiece or associated support, said second means comprising:

a tubular member having an inner bearing surface to slidably and rotatably receive the boring bar, a first adjustment plate having an aperture through which the tubular member passes and having means for positioning the first adjustment plate in a fixed position relative to the bore in the workpiece, and a second adjustment plate having an aperture through which the tubular member passes, the first and second adjustment plates having manually adjustable co-operating means to enable the second adjustment plate to be moved in one direction transverse to the length of the boring bar, and the tubular member and the second adjustment plate having manually adjustable co-operating means for moving the tubular member in a direction perpendicular to said one direction and transverse to the length of the boring bar.

* * * * *